United States Patent [19]

Maeda et al.

[11] Patent Number: 5,071,632
[45] Date of Patent: Dec. 10, 1991

[54] PROCESS FOR PREPARING CRYSTALS OF ANHYDROUS SODIUM SULFIDE

[75] Inventors: Kannosuke Maeda, Ashiya; Yoshio Aoyama, Kyoto, both of Japan

[73] Assignee: Sankyo Kasei Co., Osaka, Japan

[21] Appl. No.: 645,348

[22] Filed: Jan. 23, 1991

Related U.S. Application Data

[63] Continuation of Ser. No. 394,033, Aug. 15, 1989, abandoned.

[30] Foreign Application Priority Data

Aug. 25, 1988 [JP] Japan .................................. 63-212222

[51] Int. Cl.$^5$ .............................................. C01B 17/22
[52] U.S. Cl. .................................. 423/566.2; 23/302 T
[58] Field of Search ...................... 423/566.2; 23/302 T

[56] References Cited

U.S. PATENT DOCUMENTS

| | | | |
|---|---|---|---|
| 1,843,767 | 2/1932 | Heath | 423/566.2 |
| 1,946,089 | 2/1934 | Mayers | 423/566.2 |
| 2,533,163 | 12/1950 | Copes et al. | 423/566.2 |

FOREIGN PATENT DOCUMENTS 3636585  1/1973  U.S.S.R. ........................... 423/566.2

OTHER PUBLICATIONS

Chemical Abstracts, 86:123811y (1977).
Chemical Abstracts, p. 1939, Abstract No. 5606(6), Columbus, Ohio, US; B. P. Ershov et al.: "Obtaining Chemically Pure Sodium Sulfide. Preliminary Communications", & J. Chem. Ind. 16, No. 2, 48-50 (1939) *Abstract*.
Chemical Abstracts, vol. 78, No. 22, Jun. 4, 1973, p. 137, Abstract No. 138433k, Columbus, Ohio, US; & SU-A-363 658 (Institute of Metallurgy and Ore Beneficiation, Academy of Sciences, Kazakh S. S. R.) 25-1-2-1972.
Chemical Abstracts, vol. 68, No. 24, 1968, p. 10483, Abstract No. 108432k, Columbus, Ohio, US; N. I. Kopylov: "Sodium Sulfide-Water System and Thermal Dehydration of Na2S.9H20", & Zh. Neorg. Khim. 13(2), 529-532 (1968) *Abstract*.
J. Chem. Soc. Dalton Trans., No. 3, 1986, pp. 469-475; J. Y. Andersson et al.: "Mechanisms and Kinetics of the Thermal Decomposition of Sodium Sulphide Pentahydrate Under Controlled Water Vapor Pressure".

*Primary Examiner*—Gary P. Straub
*Assistant Examiner*—Stephen G. Kalinchak
*Attorney, Agent, or Firm*—Armstrong, Nikaido, Marmelstein, Kubovcik & Murray

[57] ABSTRACT

Disclosed is a process for preparing crystals of anhydrous sodium sulfide, the process being characterized in that the process comprises the steps of heating a water-containing non-crystalline sodium sulfide at a temperature of about 30° to about 89° C. under a pressure of about 500 torr or less for about 2 hours or longer in a first-stage heating step and further heating the sodium sulfide at a temperature of about 90° to about 200° C. under atmospheric pressure or reduced pressure for about 2 hours or longer in a second-stage heating step.

8 Claims, 1 Drawing Sheet

5,071,632

PROCESS FOR PREPARING CRYSTALS OF ANHYDROUS SODIUM SULFIDE

This application is a continuation of application Ser. No. 394,033 filed Aug. 15, 1989, now abandoned.

BACKGROUND OF THE INVENTION

The present invention relates to a process for preparing crystals of anhydrous sodium sulfide.

Currently commercially available sodium sulfides include crystalline sodium sulfides containing water of crystallization (such as $Na_2S \cdot 9H_2O$, $Na_2S \cdot 6H_2O$, $Na_2S \cdot 5.5H_2O$, $Na_2S \cdot 5H_2O$ and the like) prepared by cooling or concentrating an aqueous solution of sodium sulfide to cause precipitation; water-containing non-crystalline sodium sulfides prepared by solidifying into pellets, flakes, chips or the like the whole of a hot aqueous solution of sodium sulfide having a concentration of about 60%; etc. However, these sodium sulfides, which have a water content of 30% or more, suffer the drawbacks of being significantly deliquescent and easily oxidizable. Furthermore, the chemical reaction using such sodium sulfide poses the problem that the water present in the sodium sulfide may induce the undesirable side reaction or may shift the direction of progress of reaction. In view of these problems, there is a demand for anhydrous sodium sulfides free of such defects.

Conventional processes for preparing anhydrous sodium sulfide by dehydration of hydrated sodium sulfide include, for example, those comprising dehydrating hydrated sodium sulfide under reduced pressure by heating at a temperature at which the hydrate is partially fused. However, fusion of hydrated sodium sulfide gives a highly viscous mass which firmly adheres to a reactor, becoming difficult to stir or withdraw.

Also known is a process comprising heating hydrated sodium sulfide ($Na_2S \cdot 9H_2O$) without stirring under specific conditions including a reduced pressure of 1 torr and gradually elevating the temperature to 800° C. without melting to achieve forced dehydration (U.S. Pat. No. 2533163). Yet this process is not suitable for use because it requires heating at an exceedingly high temperature. Moreover, the anhydrous sodium sulfide prepared by forced dehydration of hydrate assumes the skeletal crystal form retaining the original crystal form of hydrate, and is consequently great in specific surface area, deliquescent and readily oxidizable.

An object of the present invention is to provide a simplified process for preparing crystals of anhydrous sodium sulfide which are unlikely to deliquesce and to oxidize and easy to handle.

Other objects and features of the invention will become apparent from the following description.

SUMMARY OF THE INVENTION

The present invention provides a process for preparing crystals of an anhydrous sodium sulfide, the process being characterized in that the process comprises the steps of heating a water-containing non-crystalline sodium sulfide at a temperature of about 30° to about 89° C. under a pressure of about 500 torr or less for about 2 hours or longer in a first-stage heating step and further heating the sodium sulfide at a temperature of about 90° to about 200° C. under atmospheric pressure or reduced pressure for about 2 hours or longer in a second-stage heating step.

DESCRIPTION OF THE INVENTION

Figure 1:
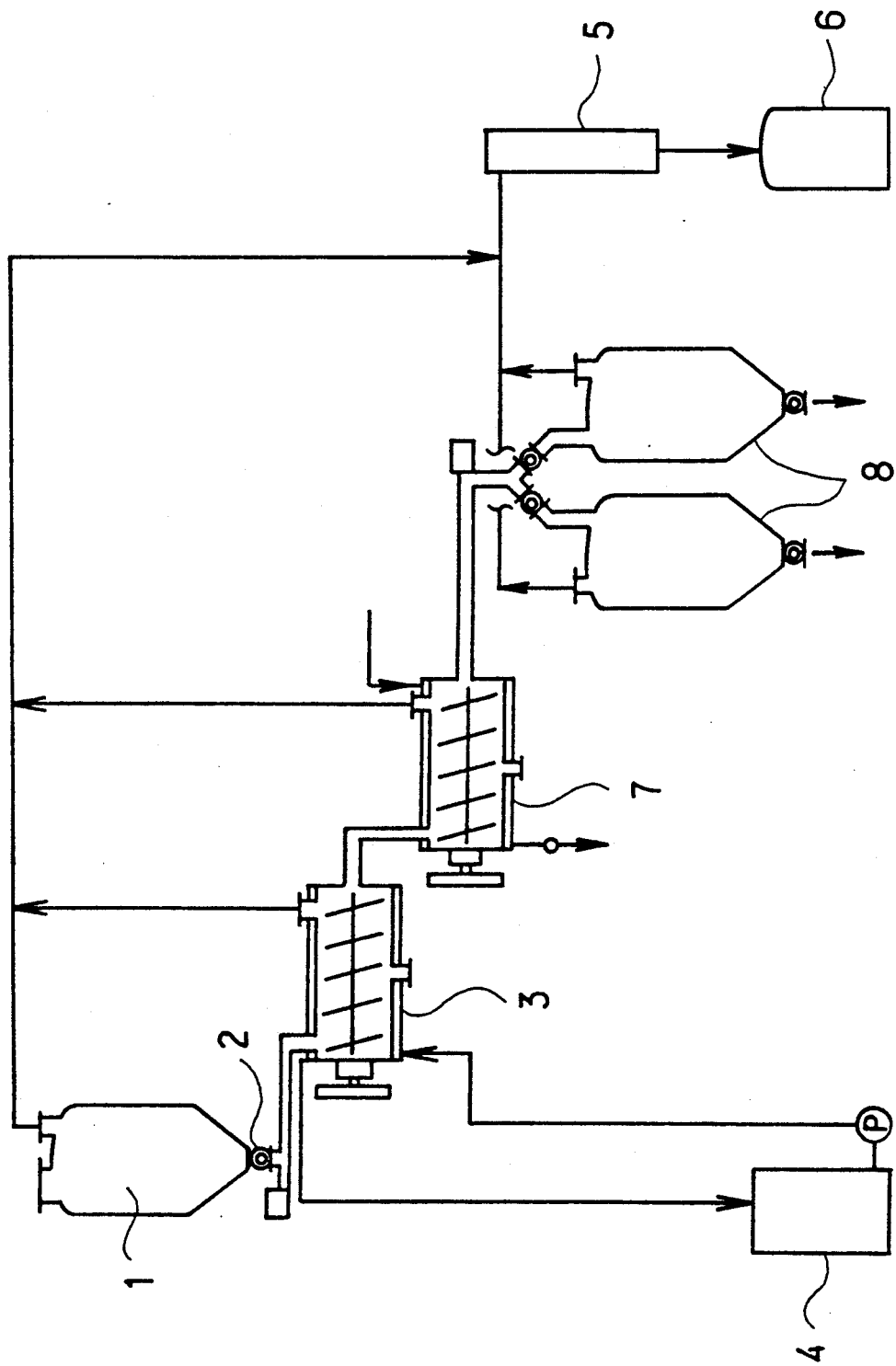
FIG. 1 is a flow chart of an apparatus for producing crystals.

According to the process of the invention, the water-containing non-crystalline sodium sulfide obtained in the form of pellets, flakes, chips or the like by cooling a solution of sodium sulfide in a high concentration until solidification are heated at a temperature of about 30° to about 89° C. under reduced pressure and further heated at a temperature of about 90° to about 200° C. under atmospheric pressure or reduced pressure, namely subjected to a two-stage heating procedure, whereby the water-containing non-crystalline sodium sulfide is converted into cubic-system crystals of anhydrous sodium sulfide in a solid state without causing melting. The thus obtained crystals of anhydrous sodium sulfide are compact cubic-system crystals and are markedly unlikely to deliquesce and oxidize, hence significantly useful.

Useful as the starting material in the present invention is the water-containing non-crystalline sodium sulfide obtained in the form of pellets, flakes, chips or the like by solidification of the whole of an aqueous solution of sodium sulfide.

The water-containing non-crystalline sodium sulfide can be prepared by cooling an aqueous solution of sodium sulfide to a solid state. More specifically, the sodium sulfide is obtained, for example, by preparing an aqueous solution of sodium sulfide in the predetermined concentration and then cooling the solution for solidification of the whole solution or by pouring the solution into a rotating drum, rapidly cooling the solution therein and making the solids into a water-containing non-crystalline compound in the form of flakes or the like by a scraper. The aqueous solution of sodium sulfide for use in preparation of a water-containing non-crystalline sodium sulfide can be produced by dissolving sodium sulfide in water or mixing an aqueous solution of sodium hydrosulfide with an aqueous solution of sodium hydroxide for synthesis of sodium sulfide, followed, when required, by concentrating the mixture.

A water-containing non-crystalline sodium sulfide suitable for use in the process of the present invention is one containing about 35 to about 90% by weight, preferably about 40 to about 65% by weight, of sodium sulfide component. While usable in any particulate form selected from pellets, flakes, chips, etc., the sodium sulfide is preferably used after having been crushed into particles having a particle size of about 0.05 to about 0.8 mm.

According to the process of the present invention, the water-containing non-crystalline sodium sulfide is heated in a first-stage heating step at a temperature of about 30° to about 89° C., preferably about 65° to about 80° C., under a pressure of about 500 torr or less, preferably about 50 torr or less. The heating time in this step is about two hours or longer, usually about 2 to about 6 hours, preferably about 3 to about 5 hours. The heating in this step is conducted preferably with stirring. This heating step renders turbid the surface of sodium sulfide. The thus heat-treated sodium sulfide is heated to a higher temperature in the second-stage heating step without melting with the result that the hydrate can be prevented from agglomerating or from adhering to the converter and can be homogeneously stirred with ease.

In the second-stage heating step, the sulfide is heated at a temperature of about 90° to about 200° C., preferably about 140° to about 160° C., under atmospheric pressure or reduced pressure, preferably a pressure of about 90 to about 500 torr. The heating time in this step is about 2 hours or longer, usually about 2 to about 6 hours, preferably about 3 to about 5 hours. Preferably the heating in this step is performed with stirring.

The water-containing non-crystalline sodium sulfide is converted by the two-stage heat treatment into cubic-system crystals of anhydrous sodium sulfide in a solid state without melting.

The crystals of anhydrous sodium sulfide prepared by the process of this invention are dense in crystal structure and are smaller in specific surface area and unlikelier to deliquesce or oxidize than the skeletal crystals produced by forced dehydration.

According to the process of the invention, the crystals of anhydrous sodium sulfide can be easily prepared from a water-containing non-crystalline sodium sulfide. The crystals of anhydrous sodium sulfide prepared according to the invention have a high purity and are not prone to deliquesce and oxidize. With such characteristics, the crystals thereof can be used as a high-purity anhydrous sodium sulfide easy to handle and find wide applications, for example, as starting materials for preparing polyphenylene sulfide (PPS) resin, sulfur dye or the like, or as materials for use in chemical reactions which require use of anhydrous materials.

The present invention will be described below in more detail with reference to the following Examples.

EXAMPLE 1

A 100 g quantity of an aqueous solution of sodium hydroxide (conc. 48%) was mixed with 125 g of an aqueous solution of sodium hydrosulfide (conc. 53.7%). The mixture was concentrated at a temperature of 110° C. under a pressure of 50 torr to remove 22 g of water, giving 203 g of an aqueous solution containing 46.0% by weight of sodium sulfide. The aqueous solution was caused to flow over a glass plate having a surface at a temperature of 5° C. and quickly coagulated, giving a coagulated water-containing non-crystalline sodium sulfide. The coagulum was partly shaved off, analyzed by the method according to JIS K-1435 and found to contain 46.1% by weight of sodium sulfide.

The flakes of the sodium sulfide obtained by the above method were crushed into particles having a particle size of about 0.3 mm. The particles were placed into a rotary evaporator equipped with a 1 l-vol. converter. The pressure in the converter was adjusted to 19 to 20 torr by a vacuum pump. Then the particles were heated at a temperature of 76° C. with stirring in an oil bath for 3.5 hours. The water vapor given off was condensed for recovery by a condenser.

Thereafter the thus obtained reaction product was rapidly heated to 100° C. and further heated to 160° C. under a pressure of 100 torr over a period of 3 hours, whereby 93 g of a reaction product was obtained and 109 ml of separated water was recovered.

The reaction product was found to contain 98.59% of crystals of anhydrous sodium sulfide and 0.002% of water.

EXAMPLE 2

A 27.39 kg quantity of an aqueous solution of sodium hydroxide (conc. 73% by weight) was mixed with 38.35 kg of an aqueous solution of sodium hydrosulfide (conc. 73% by weight) in a 100 l-vol. stainless steel reactor. The mixture was heated to a temperature of 100° C. and 27.56 kg of water was added thereto. The mixture was sufficiently stirred and immediately coagulated in an ice chamber at −5° C. The coagulum was partly shaved off, analyzed by the method according to JIS K-1435 and found to contain 41.6% by weight of sodium sulfide.

The coagulum was shaved and pulverized by a crusher into particles having a particle size of about 0.1 to about 0.3 mm. The particles were made into crystals of anhydrous sodium sulfide with use of an apparatus for producing crystals which operates according to the flow chart shown in FIG. 1. The product procedure is as follows.

A ⅓ portion of the particles was placed into a 50 l-vol. stainless steel measuring tank 1. A valve 2 was opened to admit the particles into a 50 l-vol. stainless steel converter 3. The pressure in the converter 3 was adjusted to 20 torr. Water was heated to 90° C. in a 50 l-vol. stainless steel water-heating bath 4 and circulated around the converter 3 to heat the contents to 71° C. at which they were maintained with stirring for 5 hours. The water vapor given off was condensed by a condenser 5 and collected at a 50 l-vol. stainless steel reservoir 6.

The contents in the converter 3 were sent to a 50 l-vol. stainless steel converter 7 wherein they were heated to 160° C. with a vapor under a pressure of 100 torr and maintained at the same temperature with stirring for 5 hours.

The emitted water vapor was condensed in the condenser 5 and collected at the reservoir 6. The reaction product in the converter 7 was fed into a product container 8 wherein 13 kg of a product was obtained. The product was found to contain 97.9% of crystals of anhydrous sodium sulfide and 0.003% of water.

EXAMPLE 3

A 27.39 kg quantity of an aqueous solution of sodium hydroxide (conc. 73%) and 38.35 kg of an aqueous solution of sodium hydrosulfide (conc. 73%) were placed into a 100 l-vol. stainless steel reactor and mixed together. The mixture was heated to 120° C. and stirred for 4 hours. The hot aqueous solution was discharged into a 100 l-bath with a flat bottom and coagulated as a whole in an ice chamber.

The coagulum was partly shaved off, analyzed by the method of JIS K-1435 and found to contain 59.3% by weight of sodium sulfide.

A half portion (32.87 kg) of coagulum obtained above was treated in the same manner as in Example 2, giving 19.1 kg of crystals of anhydrous sodium sulfide.

The reaction product was found to contain 98.1% of anhydrous sodium sulfide and 0.002% of water.

We claim:

1. A process for preparing cubic-system crystals of anhydrous sodium sulfide comprising, heating a water-containing non-crystalline solid state sodium sulfide, which sodium sulfide remains in the solid state throughout the entire process, at a temperature of about 30° to about 89° C. under a pressure of about 500 torr or less for about 2 hours or longer in a first-stage heating step and further heating the solid state sodium sulfide at a temperature of about 90° to about 200° C. under atmospheric pressure or reduced pressure for about 2 hours or longer in a second-stage heating step to form said anhydrous sodium sulfide.

2. The process of claim 1 wherein the water-containing non-crystalline sodium sulfide is one prepared by solidifying the whole of an aqueous solution of sodium sulfide.

3. The process of claim 1 wherein the water-containing non-crystalline sodium sulfide is in the form of pellets, flakes or chips containing about 35 to about 90% by weight of sodium sulfide.

4. The process of claim 1 wherein the water-containing non-crystalline sodium sulfide is in the form of crushed fragments having a particle size of about 0.05 to about 0.8 mm.

5. The process of claim 1 wherein the heating in the first-stage heating step is conducted under a pressure of about 50 torr or less.

6. The process of claim 1 wherein the heating in the first-stage heating step is conducted under a temperature of about 65° to 80° C.

7. The process of claim 1 wherein the heating in the second-stage heating step is conducted under a pressure of about 90 to about 500 torr.

8. The process of claim 1 wherein the heating in the second-stage heating step is conducted at a temperature of about 140° to about 160° C.

* * * * *